Figures 1, 2, 3:
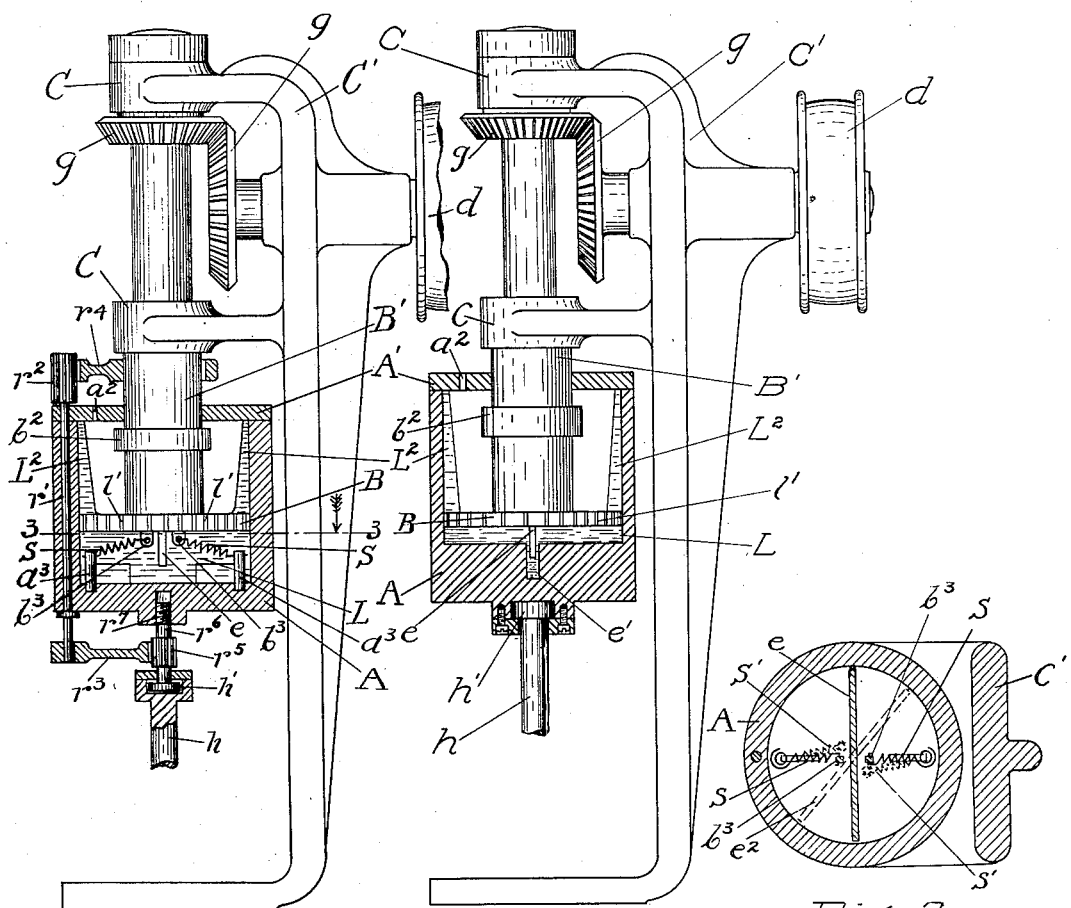

H. E. WARREN.
CENTRIFUGAL APPARATUS.
APPLICATION FILED MAR. 13, 1908.

931,707.

Patented Aug. 17, 1909.
3 SHEETS—SHEET 1.

WITNESSES:
F. B. Dodge
C. W. McCaul

INVENTOR.
Henry E. Warren

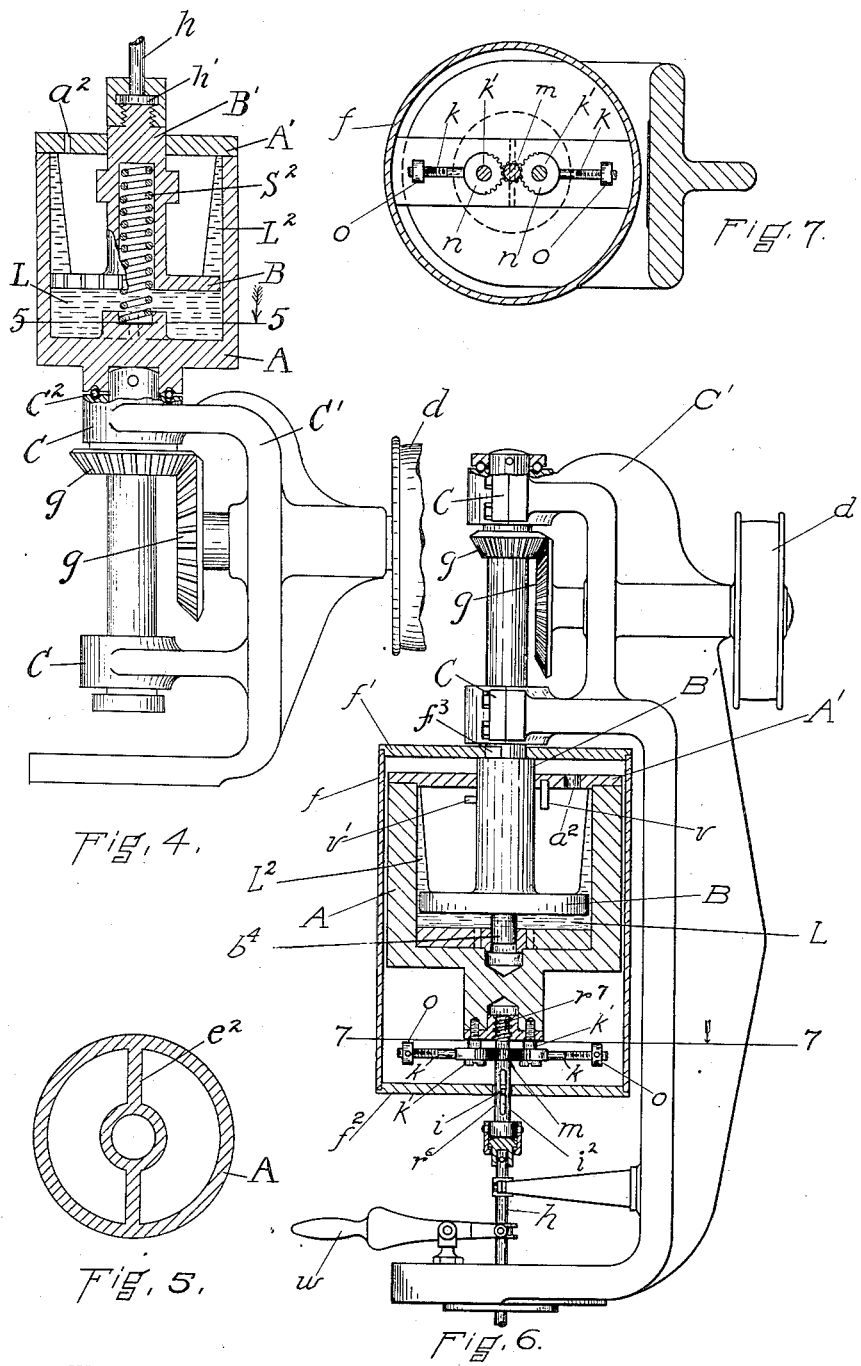

H. E. WARREN.
CENTRIFUGAL APPARATUS.
APPLICATION FILED MAR. 13, 1908.

931,707.

Patented Aug. 17, 1909.
3 SHEETS—SHEET 3.

WITNESSES:

INVENTOR.
Henry E. Warren

UNITED STATES PATENT OFFICE.

HENRY E. WARREN, OF ASHLAND, MASSACHUSETTS, ASSIGNOR TO THE LOMBARD GOVERNOR COMPANY, OF ASHLAND, MASSACHUSETTS, A CORPORATION OF NEW JERSEY.

CENTRIFUGAL APPARATUS.

No. 931,707.    Specification of Letters Patent.    Patented Aug. 17, 1909.

Application filed March 13, 1908. Serial No. 420,763.

*To all whom it may concern:*

Be it known that I, HENRY E. WARREN, a citizen of the United States of America, residing at Ashland, in the county of Middlesex and State of Massachusetts, have invented new and useful Improvements in Centrifugal Apparatus Applicable to the Control or Indication of Speed of Motors, of which the following is a specification.

The invention relates to centrifugal apparatus for controlling or indicating the speed of motors, and consists in a rotatable vessel closed at one end, to contain liquid, and a piston within the vessel by which it is divided into two chambers, that one between the closed end of the vessel and the piston being filled with liquid; thus the piston becomes a gage of the amount of liquid beneath it, and by means of one or more openings for the passage of liquid, from one side of the piston to the other, when the vessel and piston are rotated at a speed above normal, the centrifugal action will cause the liquid to flow through the passages from the full chamber to the other, which will reduce the liquid pressure in the full chamber and tend to produce a vacuum therein, and as a result the vessel or piston being held against movement axially, the external atmospheric pressure will cause a movement in one direction of the movable member in relation to the fixed member; when the speed of rotation is reduced the liquid will return through the passages, and a reciprocating movement of the movable member will take place in line with its axis. To utilize these movements means are provided to connect the movable member with a speed controller or indicator, so that an increase in speed of rotation of the apparatus will produce a movement of the controller in one direction and a decrease in speed of rotation a movement in the other direction, and thus the reciprocation of the vessel and piston one in relation to the other will be imparted to the controller or indicator with which the moving part is connected.

If within the chamber filled with liquid one or more projecting wings are attached to the member which is positively driven any change in speed of rotation between the vessel and piston will immediately be imparted to the liquid in the full chamber; while the liquid in the other or outer chamber which is caused to rotate only by friction upon the walls of the vessel, and which therefore tends to rotate at a constant speed, will slip upon such walls and lag behind or run ahead of the speed of rotation of the driven member when any sudden change of speed thereof occurs, and consequently the centrifugal force upon the liquid in the full chamber will momentarily become greater or less than that upon the liquid in the other chamber. When by an increase in speed, it becomes greater upon the liquid in the full chamber, there will be a quick momentary flow of liquid therefrom which will produce a corresponding relative movement axially between the two members in one direction, and when by a decrease in speed, the centrifugal force upon the liquid in the full chamber becomes less than upon that in the other chamber, the liquid therein will be forced back into the full chamber and thereby produce a corresponding relative movement axially between the two members in the other direction. These relative movements axially between the two members act upon the controller or indicator by the connection as heretofore explained. The wall of liquid in the outer chamber acts as the inertia member of the governor, substantially the same as the centrifugally operated weights illustrated in Figs. 6 and 7. If wings are provided in the outer chamber the inertia effect of the liquid will be prevented and the governor will respond only to actual speed changes.

Further details of the invention are, connections between the piston and vessel by which limited relative angular displacement is permitted; means which tend constantly to return them to their normal relation, and mechanism operated by said angular movement between the piston and vessel to give a movement axially to the controller, independent of that produced by the movement of the liquid in the vessel; and also means to limit the reciprocation axially of the vessel and piston in relation to each other.

These improvements above-mentioned entirely dispense with the usual construction in which weighted portions of the apparatus are caused to change their radial position in relation to their axis of revolution, and the apparatus is very simple and inexpensive in construction.

Figure 8:
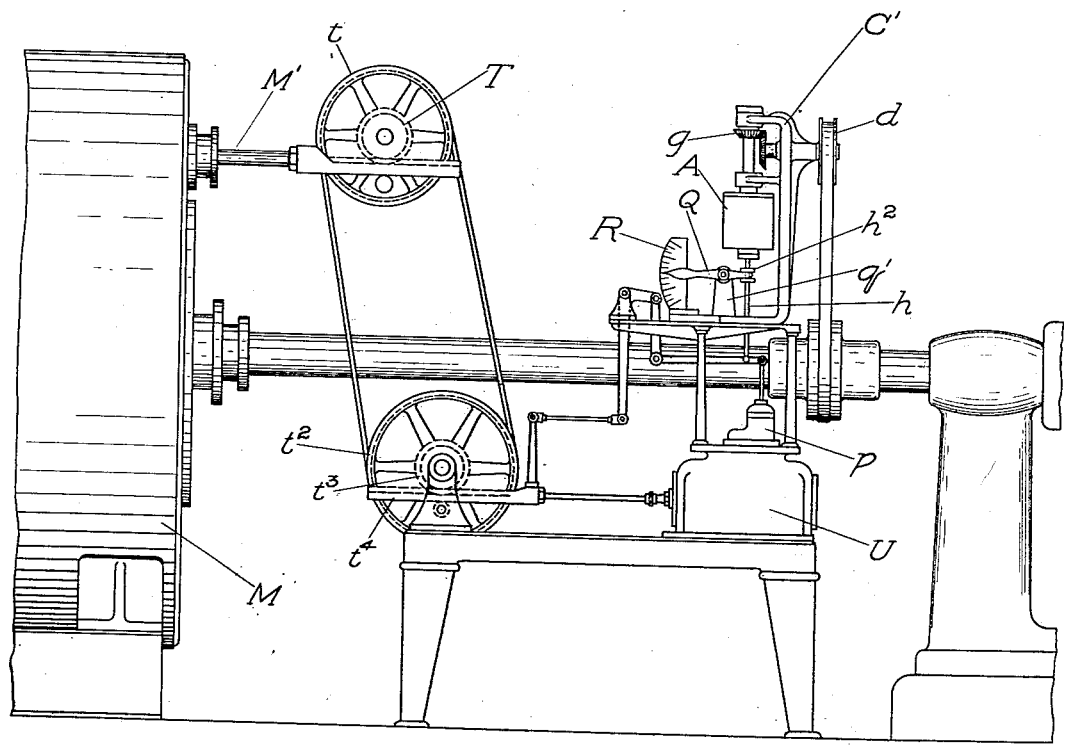

In the drawings forming a part of this specification,—Figure 1 is a side elevation of the centrifugal apparatus with the liquid containing vessel in section; Fig. 2 is an elevation of the apparatus with the vessel in section and showing means which permit relative angular displacement of the vessel and piston and one form of means which tend to return them to normal relation; also means to give independent axial movement to the controller connection; Fig. 3 is a sectional plan view of the centrifugal apparatus on line 3—3, Fig. 2, looking downward; Fig. 4 is a side elevation with the centrifugal apparatus in section, and supported above the driving gears. Herein the vessel is held against movement axially and the piston is the movable member. Fig. 5 is a sectional plan view of the lower end of the centrifugal vessel on line 5—5, Fig. 4; Fig. 6 is a side elevation of a modified form of the centrifugal apparatus, in which centrifugally operated devices are employed in place of springs to return the vessel and piston to their normal relation; Fig. 7 is a sectional plan view of the same apparatus on line 7—7, Fig. 6; Fig. 8 is a side elevation of a motor with the controller attached to the power supply gate, and the centrifugal liquid governor connected with the controller, together with a speed indicating arm attached to the controller connection, the free end of said arm moving over a graduated scale.

Referring to the same part of the apparatus in the several figures by similar reference letters, A is the vessel closed at its lower end and B the piston therein and B' the piston rod. A cover A' is provided for the open end of the vessel with a hole through it for the passage of the piston rod; the cover thus serves to prevent lateral tilting of the vessel, and also is provided with one or more openings, as $a^2$, to admit atmospheric pressure to the vessel above the piston. The piston B divides the vessel into two chambers, and the one below the piston is filled with liquid L. Passage for the liquid from one side of the piston to the other is provided, either by forming one or more grooves $l'$ in the periphery of the piston, or small holes may be made through the piston near its periphery or short grooves in the inner wall of the vessel adjacent thereto, the object being to provide free passage for liquid from one side to the other of the piston at or near its periphery. The piston rod B' is extended beyond the vessel and is supported in bearings C, C, in the frame C'. The piston rod and piston, B', B, are positively driven by bevel-gears $g$ through the belt pulley $d$. Engaging means are provided between the piston and vessel so that one may be positively driven by the other.

In Fig. 1 a wing $e$ extends from the piston and engages a slot $e'$ in the bottom of the vessel, so that the vessel will be positively driven by the piston, and as soon as any change of speed occurs in the prime motor, it is communicated to the centrifugal governor through the pulley $d$ and gears $g$, $g$; immediately the increased centrifugal force will cause the liquid beneath the piston B to pass into the chamber above the piston and stand in a wall $L^2$ around the interior of the vessel A. This movement tends to create a vacuum in the chamber from which the liquid flows, and causes the exterior atmospheric pressure to raise the vessel A, which in this case is the axially movable member, and through the interconnecting rod $h$ operate the controller $p$, (see Fig. 8). The rod $h$ is connected with the vessel A by a swivel joint $h'$, so as to permit the vessel to rotate without turning the rod, and to limit the downward movement of the vessel a ring $b^2$ is secured to the piston rod inside of the upper chamber.

In Fig. 2, opposite ends of springs $s$, $s$, are respectively secured to the piston at $b^3$, $b^3$, and to the vessel at $a^3$, $a^3$, thus permitting relative angular displacement between the piston and vessel, the springs yielding to such displacement but constantly tending to return the two members to their normal relation.

In Fig. 3, angular displacement between the piston B and vessel A is indicated by the wing shown in dotted lines $e^2$; also dotted lines $s'$, $s'$, show the position of the springs under such conditions.

In the construction shown in Fig. 2 with the wing $e$ projecting from the piston into the liquid in the lower chamber, if the interior of the vessel A is perfectly cylindrical above the piston, so as to control the rotary movement of the liquid by friction only, any sudden change of speed imparted to the piston will be imparted to the liquid in the lower chamber by the wing $e$, an increase causing a quick momentary flow from the full chamber to the other, and thus produce a corresponding movement of the vessel upward in line with its axis, and a decrease of speed causing a momentary flow of liquid from the upper chamber to the full chamber, by reason of the decrease in centrifugal force therein, and thus produce a corresponding downward movement of the vessel, the piston always being a gage of the amount of liquid beneath it. These movements of the vessel are communicated to the controller through the connecting rod $h$.

The mechanism illustrated in Fig. 2, to give movement axially to the controller supplemental to that produced by the movement of the liquid in the vessel, consists of a rod $r'$ having bearings on the vessel A, and provided with an elongated pinion $r^2$ secured to its upper end and a toothed sector $r^3$ secured to its lower end. Upon the piston rod B' above the vessel A, another toothed sector $r^4$ is secured, which meshes with the pinion $r^2$, and the sector $r^3$ is in mesh with a pinion $r^5$ upon a short rod $r^6$, which latter has a swivel connection $h'$ with the rod $h$ and a screw connection $r^7$ with the vessel A. By this means any sudden change of speed of rotation given to the piston rod B' will be communicated through the sector $r^4$, pinion $r^2$, rod $r'$, sector $r^3$ and pinion $r^5$ to the short rod $r^6$ and turn its screw $r^7$ so as either to lengthen or shorten the connection between the vessel A and the controller, and by the operation of the latter bring the speed back to normal, and this, independently of the movement of the liquid in the vessel, but proportionately to the relative angular displacement of the piston and vessel, caused by the sudden change in speed of the prime motor. As soon as the speed returns to normal the springs $s$ will restore the piston and vessel to their normal relation.

In Fig. 4 the centrifugal device is above the driving gears $g$, the vessel A being supported upon roller bearings $c^2$ on the frame C' and attached directly to the perpendicular shaft of one of the gears $g$. Herein the piston B is the axially movable member, and is supported within the vessel in normal relation thereto by a spiral spring $s^2$, the lower end of which rests in a socket at the bottom of the vessel A, and the upper end of which supports the piston and its rod. The connection with the controller is above the centrifugal governor by means of a rod $h$ provided with swivel connection with the piston rod B'. The variation of degree of centrifugal force produced by the rotating vessel moves the liquid therein from one side to the other of the piston, and causes it to be lowered or raised by the same force and in the same manner as the vessel is moved axially when that is employed as the movable member.

In Fig. 5, $e^x$ is a rib across the bottom of the vessel, to maintain the speed of rotation of the liquid therein, the same as that of the vessel.

As illustrated in Fig. 6, the driving connection between the piston-rod and the vessel is through a cylinder $f$ exterior to the vessel A. This is accomplished by means of a cross-bar $f^1$ attached at the upper end of this cylinder and secured to the piston-rod above the vessel by a key $f^3$, and by a cross-bar $f^2$ attached at the lower end of the cylinder and engaged with the rod $r^6$, by means of a pin $i$ held in the cross-bar $f^2$ which pin extends through a slot $i^2$ in the rod $r^6$. The rod $r^6$ which connects the vessel with the controller, is screwed into the base of the vessel A at $r^7$, and the means employed for permitting angular displacement of the vessel in relation to the piston and which always tend to return them to their normal relation, are the devices consisting of a pair of weighted arms $k, k$, pivoted to the lower end of the vessel A at $k', k'$. A pinion $m$ is secured to the rod $r^6$ between the inner ends of the arms $k, k$, which latter are provided with toothed sectors $n, n$, that mesh with the pinion $m$. Any sudden change of speed given to the piston rod and piston from the pulley $d$ is communicated through the cylinder $f$, cross-bars $f'$, $f^2$, and pin $i$ to the rod $r^6$, the turning of which lengthens or shortens the distance between the vessel A and the controller, by means of the screw $r^7$, and the connection through the rod $h$, thus increasing or decreasing the supply of motive fluid to motor and restoring it to normal speed. When the rod $r^6$ is turned independently of the vessel A, the pinion $m$ is turned with it, and this pinion being in mesh with the sectors $n, n$, on the inner ends of the arms $k, k$, those arms will be thrown out of alinement temporarily; but the centrifugal action upon the weights $o$ on arms $k$ will immediately tend to return them to their position of equilibrium and alinement, which they will assume as soon as the speed of the motor ceases acceleration or retardation, and the normal length of the connection beetween the centrifugal governor and the controller will at the same time be restored. To prevent a relative angular displacement between the vessel and piston, greater than 180° in either direction, a stop $v$ is secured to the under side of the cover A' and another stop $v'$ upon the side of the piston rod B. From the lower side of the piston B, a projecting pin $b^4$ engages a hole or socket in the bottom of the vessel A to prevent relative lateral movement, and the piston here shown is of a little less diameter than the interior of the vessel, to furnish free passage for the liquid, in place of grooves or holes. Also, a hand lever $w$ is provided by which the controller may be operated.

In the assembled view, Fig. 8, an indicator is shown consisting of an arm Q fulcrumed upon a standard $q'$ on a fixed part of the machine; one end of the arm Q is forked so as to play between collars $h^2$ on the rod $h$, while the other end of the arm Q is located over a graduated segment R to indicate speed revolutions above or below an established normal. By this means the movement of the rod $h$ up or down will cause the indicator arm Q to move over the plate R, and by the graduations thereon indicate the variations of speed of the motor.

In Fig. 8, M is the motor, M' the shaft which controls the power supply therefor, and by means of a rack thereon this shaft is operated by a gear T on the shaft of the pulley $t'$, which latter is belted to a pulley $t^2$, on the shaft of which is a gear $t^3$ meshing with a rack $t^4$ on the piston rod of the main controller U. By the operation of the controller the rack $t^4$ is caused to reciprocate, and through the above named system of gears and belt connection, to operate the shaft M'. The power for the controller U is regulated by the secondary controller $p$, which as heretofore explained is operated by the centrifugal governor A.

From the foregoing it will be understood that it is immaterial which member of the centrifugal speed-responsive element moves axially in relation to the other. As heretofore stated either the vessel or the piston may be supported by fixed bearings, and the one not so supported should be adapted to move, in relation to the fixed member, in the direction of its axis, when the liquid in the vessel is moved from one side to the other of the piston in response to the variations of speed of rotation of the two members, such motion of the movable member being communicated to the controller by suitable connection.

I claim:—

1. A rotatable vessel closed at one end, to contain liquid a piston within, which divides the vessel into two chambers, a passage for liquid from one chamber to the other, means to rotate the vessel and piston, and by centrifugal action cause the liquid to flow from one side of the piston to the other, reduce the liquid pressure on the side from which it flows and thus tend to produce a vacuum upon that side and cause the pressure of the atmosphere to produce a movement axially between the vessel and piston, one in relation to the other.

2. A rotatable vessel closed at one end, to contain liquid a piston within which divides the vessel into two chambers, a passage for liquid from one chamber to the other, means to rotate the vessel and piston, and by centrifugal action cause the liquid to flow from one side of the piston to the other, reduce the liquid pressure on the side from which it flows and produce a movement axially between the vessel and piston, one in relation to the other, and means to connect the moving member with a device which is to be operated.

3. A centrifugal speed-responsive element consisting of a cylinder and piston therein, one of which two members may be reciprocated in relation to the other, a piston rod extending from the cylinder, an operative connection between one of the said reciprocating members and the controller of a prime motor, liquid to fill the space between one side of the piston and head of the cylinder, a passage for liquid from that side of the piston to the other, and means to rotate the cylinder and piston, and by centrifugal action cause the liquid to pass from the filled space to the other side of the piston and thus by the reduction of liquid pressure within said space below the pressure of the atmosphere without, produce a movement axially between the cylinder and piston, one in relation to the other.

4. In a centrifugal speed governor, a cylinder closed at one end to contain liquid, a piston therein with a passage for liquid between it and the cylinder, a piston rod extending from the cylinder and fixed bearings in which the rod is supported and may rotate, means to communicate such rotation to the cylinder, a swivel-connection between the cylinder and a controller, liquid in the cylinder to fill the space beneath the piston, and means to rotate it with the cylinder, and by centrifugal action withdraw liquid from beneath the piston, and cause the cylinder to move upward over the rod and piston.

5. In a centrifugal speed governor, a vessel to contain liquid and a piston therein, one of which is adapted to reciprocate in relation to the other, a passage for liquid from one side of the piston to the other, a rotatable piston rod supported exteriorly to the vessel, and means upon the rod to limit the movement axially, of the vessel and piston in relation to each other.

6. In a centrifugal speed governor, a vessel to contain liquid, a piston therein, a passage for liquid from one side of the piston to the other, a rotatable piston rod supported exteriorly to the vessel, means to rotate the rod and piston and a driving-connection between them and the vessel which will permit limited relative angular displacement.

7. In a centrifugal speed controller or indicator, a vessel to contain liquid, a piston therein, a passage for liquid from one side of the piston to the other, means to rotate the piston and vessel and by centrifugal action move liquid through said passage and cause a movement axially between the vessel and piston one in relation to the other, a driving connection between the piston and vessel which permits relative angular displacement from their normal relation, and means which constantly tend to return them to normal relation.

8. In a centrifugal speed controller or indicator, a vessel to contain liquid, a piston therein, a passage for liquid from one side of the piston to the other, means to rotate the piston and vessel and by centrifugal action move liquid through said passage and cause a movement axially between the vessel and piston one in relation to the other, a driving connection between the piston and vessel which permits relative angular displacement from their normal relation, and centrifugally operated means which constantly tend to return them to normal relation.

9. A centrifugal speed governor, comprising a vessel to contain liquid, a piston therein having a rod extending out of the vessel, openings for liquid to pass from one side of the piston to the other, means to rotate the rod and piston and by centrifugal action cause liquid to pass from one side of the piston to the other and thereby produce a movement, axially, between the vessel and piston one in relation to the other, means for connecting the member which is given such movement to a device to be operated, a driving connection between the piston and vessel which permits their relative angular displacement, and mechanism operated by such angular movement to give movement axially to said device, supplemental to that produced by the centrifugal force.

HENRY E. WARREN.

Witnesses:
I. B. DODGE,
C. W. McCAUL.